United States Patent
Salarian et al.

(10) Patent No.: US 9,658,701 B2
(45) Date of Patent: May 23, 2017

(54) INPUT DEVICE WITH HYBRID TRACKING

(71) Applicant: Logitech Europe S.A., Lausanne (CH)

(72) Inventors: Arash Salarian, Dubendorf (CH);
Nicolas Chauvin, Chexbres (CH);
David Tarongi Vanrell, Epalinges (CH)

(73) Assignee: Logitech Europe S.A., Lausanne (CH)

( * ) Notice: Subject to any disclaimer, the term of this patent is extended or adjusted under 35 U.S.C. 154(b) by 667 days.

(21) Appl. No.: 14/165,290

(22) Filed: Jan. 27, 2014

(65) Prior Publication Data
US 2015/0211839 A1    Jul. 30, 2015

(51) Int. Cl.
*G06F 3/033*    (2013.01)

(52) U.S. Cl.
CPC .................... *G06F 3/033* (2013.01)

(58) Field of Classification Search
CPC ....................................................... G06F 3/033
USPC ........................................................... 702/95
See application file for complete search history.

(56) References Cited

U.S. PATENT DOCUMENTS

| | | | |
|---|---|---|---|
| 2007/0008286 A1* | 1/2007 | Theytaz | G06F 3/03543 345/166 |
| 2010/0066672 A1* | 3/2010 | Schoolcraft | G06F 1/1626 345/158 |
| 2015/0049021 A1* | 2/2015 | Cheng | G06F 3/0325 345/163 |

* cited by examiner

*Primary Examiner* — Bryan Bui
(74) *Attorney, Agent, or Firm* — Kilpatrick Townsend & Stockton LLP

(57) ABSTRACT

Embodiments of the invention are directed to input devices configured for use with computing devices. The present invention relates to input devices configured with a plurality of sensors configured to determine the displacement and position of the input device. Tracking of the input device may be switched from an optical sensor to an inertial sensor based on the speed of movement of the input device or based on the input device detecting that loss of tracking has occurred. In some embodiments, a gyroscope may be configured to modify data from the inertial sensor module to correct for fictitious accelerations generated when the input device is rotated.

23 Claims, 9 Drawing Sheets

INPUT DEVICE WITH HYBRID TRACKING

BACKGROUND OF THE INVENTION

Input devices provide a user the ability to interact with a computing device. Typical input devices can include keyboards, computer mice, styluses, remote controls or other similar forms. Input devices in the form a computer mouse provide a user interacting with the computing device the ability to perform certain activities, including navigation, cursor control, and selection functions.

A common form of computer mouse is an optical mouse. Typical optical mice function by using a light-emitting diode to detect the movement of the optkical mouse relative to a surface (e.g., a mouse pad, a desk or a table). Optical mice operate by using a sensor or camera that takes successive images of the surface upon which the optical mouse is being moved upon. Based on an overlap of successive images, the optical mouse detects the offset between the successive images which represents the distance that the optical mouse has moved relative to the surface.

One problem that exists with current optical mice is that there is an upper limit on how fast the user can move the optical mouse. Some users may require a high-performance computer mouse that is capable of detecting fast movements by the user. Some of these users may require the high-performance computer mouse for a computer game that requires the user to make fast movements using the computer mouse. If the user moves their optical mouse at a speed faster than the upper limit, loss of tracking can occur where the location of the mouse and associated cursor are lost. In such cases, successive images produced by the sensor or camera may not have sufficient overlap to determine an offset. As a result, the optical sensor may lose track of the location of the optical mouse and produce unreliable displacement and location data. This can cause a cursor displayed on a monitor or display to stop (e.g., freeze) or jump around to random positions in any direction as the optical sensor attempts to correlate any data it receives resulting in spurious correlations.

This loss of tracking can result in a negative user experience as the user is limited in the functionality and range of motion that may be conducted by the optical mouse. For example, the user may not be able to swipe their mouse quickly while engaged in a computer game without the mouse losing track of its displacement.

In previous solutions, in order to increase the upper speed limit of an optical mouse, the frame rate of the imaging sensor was increased. However, a higher frame rates is accomplished by shorter exposure times and less illumination. To compensate for reduced illumination, a brighter light source or LED and/or more sensitive imaging sensor was required. Increasing the brightness of the LED required higher power consumption and as the power consumption of the optical mouse increased, it made it difficult to design an optical mouse that would perform at high speeds and still be wireless. Being wired to a host system limits the usability of the optical mouse to the target group of users as wired computer mice limit the freedom of movement that may be required for computer gaming.

Moreover, the brightness of LED cannot be increased too much due to multiple concerns about power consumption of wireless mice, heat generation, current draw in the wired mice, increased circuit complexity of the LED drivers, etc. In addition, if the mice are based on laser LED technology due to concerns for eye safety, the brightness of the laser cannot exceed specific standards. Using a more sensitive imaging sensor also has its drawbacks as the cost is higher and there are theoretical limits on the sensitivity of the sensor related to the number of photons absorbed by each pixel during the exposure time.

Based on the foregoing, there is a need in the art for improved methods and systems for input devices that provide greater functionality and better user experience.

SUMMARY OF THE INVENTION

The present invention relates generally to control devices, such as human interface devices, configured for use with electronics or computing devices. More specifically, the present invention relates to methods and systems for utilizing an input device capable of operating under conditions where the input device is moved at a speed greater than a maximum speed limit of an optical sensor tracking the movement of the input device without experiencing loss of tracking.

Embodiments of the present invention provide an improved user experience by being configured to allow a user to interact with the input device with greater freedom, including at a greater range and speed of motion that input devices are typically not configured to accurately assess. Embodiments of the present invention include multiple sensors (e.g., accelerometers and/or gyroscopes) embedded within the input device that are capable of reducing loss of tracking occurrences caused when the motion of the input device exceeds the limits of an optical sensor.

Embodiments of the present invention may provide an input device comprising an optical sensor module configured to determine a first set of data relating to X-Y displacement of the input device. The input device further comprises an inertial sensor module configured to measure acceleration of the input device and to determine a second set of data relating to the X-Y displacement of the input device. The input device further comprises a microcontroller coupled to the optical sensor module and the accelerometer, where the microcontroller is configured to: receive acceleration data for the acceleration of the input device measured by the inertial sensor module, determine a speed of movement and position data of the input device using the acceleration data, and switch from tracking the X-Y displacement of the input device using the first set of data from the optical sensor module to using the second set of data from the inertial sensor module when loss of tracking is determined or detected.

In some embodiments of the present invention, the inertial sensor module is an accelerometer.

In some embodiments of the present invention, switching from tracking the X-Y displacement of the input device using the first set of data from the optical sensor module to using the second set of data from the inertial sensor module may further comprise using a last known calibration point estimated by the state-space model. In some embodiments, the state-space model is an Extended Kalman Filter.

In some embodiments of the present invention, switching from tracking the X-Y displacement of the input device using the first set of data from the optical sensor module to using the second set of data from the inertial sensor module may be based on a speed of movement of the input device. In such embodiments, when the speed of movement of the input device is below a threshold speed, the Extended Kalman Filter calibrates the inertial sensor module using the first set of data from the optical sensor module.

In some embodiments of the input device, the loss of tracking is detected when the speed of movement of the input device exceeds the threshold. In other embodiments, the loss of tracking is detected when a difference between a first speed of movement estimated by the optical sensor module and a second speed of movement estimated by the inertial sensor module exceeds a threshold. The loss of tracking may be detected in real-time.

Additional embodiments of the present invention are directed to a method of operating an input device. The method comprises determining, by an optical sensor module, a first set of data relating to X-Y displacement of the input device. The method further comprises determining, by an inertial sensor module, a second set of data relating to the X-Y displacement of the input device. The method further comprises determining whether loss of tracking by the optical sensor module has occurred. When the loss of tracking of the optical sensor module is detected to have occurred, the method further comprises switching from tracking the X-Y displacement of the input device using the first set of data from the optical sensor module to using the second set of data from the inertial sensor module. When the loss of tracking of the optical sensor module is detected to have not occurred, tracking the X-Y displacement of the input device is by the optical sensor module.

In some embodiments, the method may further comprise determining whether the optical sensor module has recovered from the loss of tracking. In such embodiments, when the optical sensor module has recovered from the loss of tracking, the method may further comprise switching from tracking of the X-Y displacement of the input device from using the second set of data from the inertial sensor module to the first set of data from the optical sensor module.

In some embodiments of the input device, loss of tracking is detected when the speed of movement of the input device exceeds the threshold. In such embodiments, determining the speed of movement of the input device further comprises determining acceleration data for the acceleration of the input device measured by the inertial sensor module, and determining the speed of movement and position data of the input device using the acceleration data.

In other embodiments, loss of tracking is detected when a difference between a first speed of movement estimated by the optical sensor module and a second speed of movement estimated by the inertial sensor module exceeds a threshold. The loss of tracking may be detected in real-time.

Additional embodiments of the present invention may provide an input device comprising an optical sensor module configured to determine a first set of data relating to X-Y displacement of the input device. The input device further comprises an inertial sensor module configured to measure acceleration of the input device and to determine a second set of data relating to the X-Y displacement of the input device. The input device may include a gyroscope configured to measure a rate of rotation of the input device, where the measured rate of rotation is used to modify the acceleration data of the input device. The input device further comprises a microcontroller coupled to the optical sensor module and the accelerometer, where the microcontroller is configured to: receive the modified acceleration data of the input device, determine a speed of movement and position data of the input device using the modified acceleration data, and switch from tracking the X-Y displacement of the input device using the first set of data from the optical sensor module to using the second set of data from the inertial sensor module when loss of tracking is detected.

In other embodiments, modifying acceleration data of the input device includes canceling out the measured rate of rotation of the input device.

In other embodiments, the microcontroller may be configured to continuously update an orientation of the input device using the rate of rotation of the input device measured by the gyroscope when the input device is in motion.

Additional embodiments of the present invention are directed to a method of operating an input device. The method comprises determining, by an optical sensor module, a first set of data relating to X-Y displacement of the input device. The method further comprises determining, by an inertial sensor module, a second set of data relating to the X-Y displacement of the input device. The rate of rotation of the input device is determined by a gyroscope. The method further comprises modifying the second set of data relating to the X-Y displacement of the input device using the rate of rotation of the input device. The method further comprises determining whether loss of tracking by the optical sensor module has occurred. When the loss of tracking of the optical sensor module is detected to have occurred, the method further comprises switching from tracking the X-Y displacement of the input device using the first set of data from the optical sensor module to using the second set of data from the inertial sensor module. When the loss of tracking of the optical sensor module is detected to have not occurred, tracking the X-Y displacement of the input device is by the optical sensor module.

In some embodiments of the input device, loss of tracking is detected when the speed of movement of the input device exceeds the threshold. In such embodiments, determining the speed of movement of the input device further comprises determining acceleration data for the acceleration of the input device measured by the inertial sensor module, and determining the speed of movement and position data of the input device using the acceleration data.

In other embodiments, loss of tracking is detected when a difference between a first speed of movement estimated by the optical sensor module and a second speed of movement estimated by the inertial sensor module exceeds a threshold. The loss of tracking may be detected in real-time.

Numerous benefits are achieved by way of the present invention over other techniques. For example, user experience, including gameplay, is better served as the user is not limited in the speed of motion that can be detected and processed by sensors in the input device. The user is thus capable of using the input device without experiencing loss of tracking due to the speed of movement of the input device exceeding a maximum speed limit of an optical sensor in the input device.

In addition to increasing the range of motion and speed of the input device, embodiments of the present invention also have the benefit of providing more refined data as to the position (e.g., the X-Y displacement) of the input device. As an optical sensor and an inertial sensor module may both operate concurrently, the data from the two devices can be used in tandem to provide more accurate real-time data as to the position of the input device. Further, leveraging the data from an optical sensor (which provides better data at slower speeds) and an inertial sensor (which provides better data at higher speeds), allows the input device to operate in multiple modes and speeds without resulting in any loss in tracking of the movement of the input device.

An additional benefit is that by allowing the optical sensor to operate with a lower frame rate, it increases the exposure time for each frame. This may allow the sensor to track on surfaces with smaller features. This expands the type and variety of the surfaces that the optical sensor can track on successfully. Thus, by relaxing the upper limit of the movement tracking speed, better surface coverage may be achievable.

These and other embodiments of the invention along with many of its advantages and features are described in more detail in conjunction with the descriptions below and attached figures.

DETAILED DESCRIPTION OF SPECIFIC EMBODIMENTS

Embodiments of the present invention are generally directed to an input device. Embodiments of the present invention are described with respect to an input device in the form of a computer mouse device. However, embodiments are not limited to input devices in the form of computer mouse devices. Other embodiments contemplate input devices in other forms, including, but not limited to, touchpad input devices, mobile phone devices, remote control devices, and other handheld input devices.

I. Systems

Figure 1:
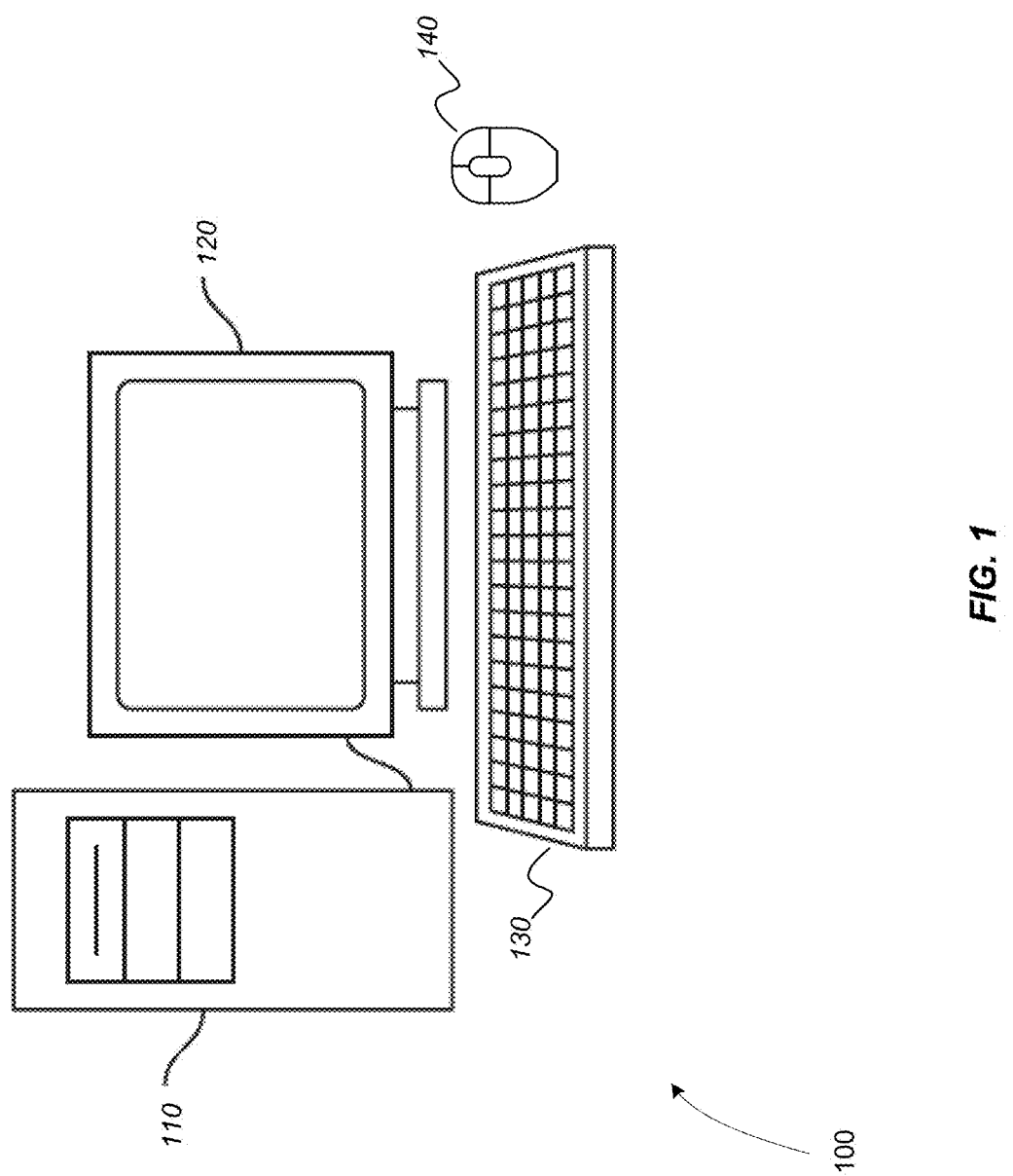
FIG. 1 illustrates a simplified diagram of a computer system according to an embodiment of the invention.

FIG. 1 is a simplified diagram of a computer system 100 according to an embodiment of the invention. Computer system 100 includes a computer 110 (which may be referred to as a host device, computer system, or system), a monitor or display device 120, and a plurality of input devices: a keyboard device 130 and a mouse device 140. In embodiments of the present invention, the computer 110 may be a desktop computer, a laptop computer, a tablet computer, a mobile phone, or any comparable computing device. In some embodiments, the mouse device 140 may be a multi-modal mouse input device. In the computer system 100, the keyboard device 130 and the mouse device 140 may be configured to control various aspects of the computer 110 and the monitor 120. In some embodiments, the keyboard device 130 and/or the mouse device 140 may be configured to provide control signals for page scrolling, cursor movements, selection of objects displayed on the monitor or display device 120, media controls, web navigation, presentation controls, and other functionality for the computer 110. In some embodiments, the keyboard device 130 and the mouse device 140 may be operably connected to the computer 110 via a hardwire link or wireless connection. In embodiments using a wireless connection, the wireless connection may be a Bluetooth™ pairing connection or any other wireless standard or proprietary wireless network protocol.

The computer 110 may include a machine readable medium (not shown) that may be configured to store computer code, such as mouse driver software, keyboard driver software, and the like, where the computer code is executable by a processor (not shown) of the computer 110 to affect control of the computer 110 by the keyboard device 130 and/or mouse device 140. It should be noted that the input devices may also be referred to as a control device, an input/output (I/O) device, and a user interface device.

Figure 2:
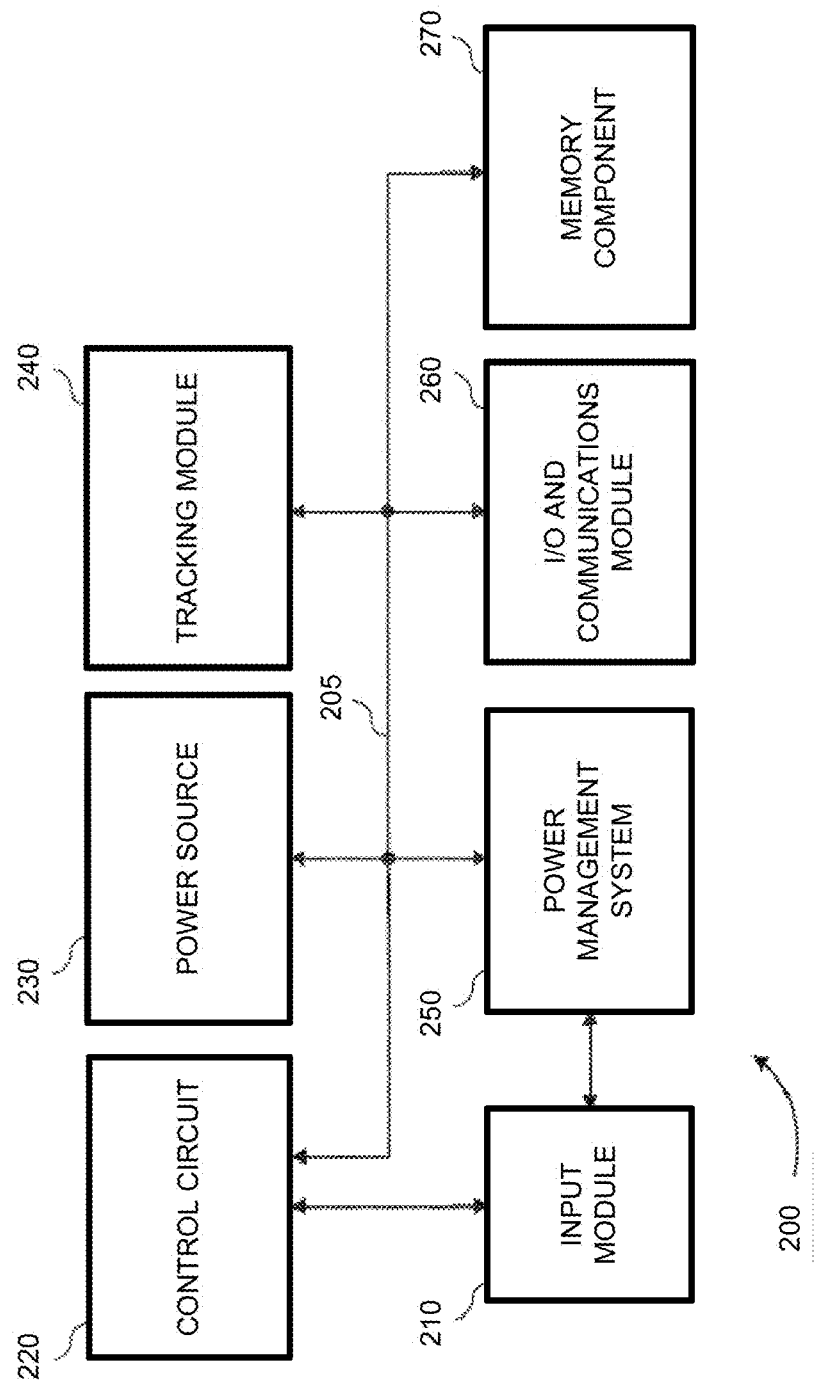
FIG. 2 is a simplified block diagram of the components of an input device according to an embodiment of the present invention.

FIG. 2 is a simplified block diagram of the components of an input device 140 according to an embodiment of the present invention. The input device 140 may be in the form of a multi-modal mouse 140. In other embodiments, the input device 140 may be a keyboard device, remote control device, a stylus device, or touchpad device. The input device 140 may include a bus 205, an input module 210, a control circuit 220, a power source 230, a tracking module 240, a power management module 250, an input/output (I/O) and communications module 260, and a memory component 270. The control circuit 220, power source 230, tracking module 240, power management module 250, input/output (I/O) and communications module 260, and memory component 270, may be in electronic communication with one another via the bus 205. The input module 210 can be independently connected to the control circuit 220 and power management module 250. In some embodiments, the input module 210 may be connected to the other modules via the bus 205. It should be noted that many other bus 205 configurations can be used that can include or exclude any of the various system elements of the input device 140 as would be known by one of ordinary skill in the art.

In some embodiments, the input module 210 can include a plurality of input elements or devices. In such embodiments, the input module 210 may be operable to receive inputs in response to a user pressing or interacting with one or more input members (e.g., buttons, scroll wheels, touchpad sensor or region) disposed on the input device 140. The input module 210 may be capable of generating control data associated with the pressed input element and sending the control data to the control circuit 220.

In some embodiments, the control circuit 220 comprises one or more microprocessors (μCs), and the control circuit 220 may be configured to control the operation of the input device 140. Alternatively, the control circuit 220 may include one or more microcontrollers (MCUs), digital signal processors (DSPs), field programmable gate arrays (FGPA), programmable logic devices (PLDs), or the like, with supporting hardware/firmware (e.g., memory, programmable I/Os, etc.), as would be appreciated by one of ordinary skill in the art with the benefit of this disclosure. Alternatively, MCUs, μCs, DSPs, and the like, may be configured in other system blocks of the input device 140. For example, a microprocessor in the computer 110 can be configured to process input commands from the input module 210 via a wireless or hardwired connection.

The power source 230 may be configured to provide power to the input device 140. In some embodiments, the power source 230 can include one or more rechargeable batteries including, but not limited to, the following types: lead-acid, alkaline, nickel cadmium (NiCd), nickel metal hydride (NiMH), lithium ion (Li-ion), lithium ion polymer (Li-ion polymer), or other rechargeable battery type known by those of ordinary skill in the art. In certain embodiments, the one or more rechargeable batteries can include AA type, AAA type, button cells (e.g., commonly found in watch batteries, hearing aid batteries, etc.), or other similarly sized battery types.

The tracking module 240 may be configured to determine a displacement of the input device 140 relative to a surface, including but not limited to a mouse pad, a wood surface, and a transparent surface. The movement of the input device 140 on the surface may generate data signals that can be translated to a movement of a pointer or cursor on a monitor or display device 120 associated with the host device 110.

In some embodiments of the present invention, the tracking module 240 may include a plurality of elements. For example, as shown in FIG. 4, one embodiment of the tracking module 240 may include an optical sensor module 402, an inertial sensor module 404, a plurality of signal processing modules 406 and 408, a comparing module 410, a state-space model module 412, and a reporting module 414.

Figure 8:
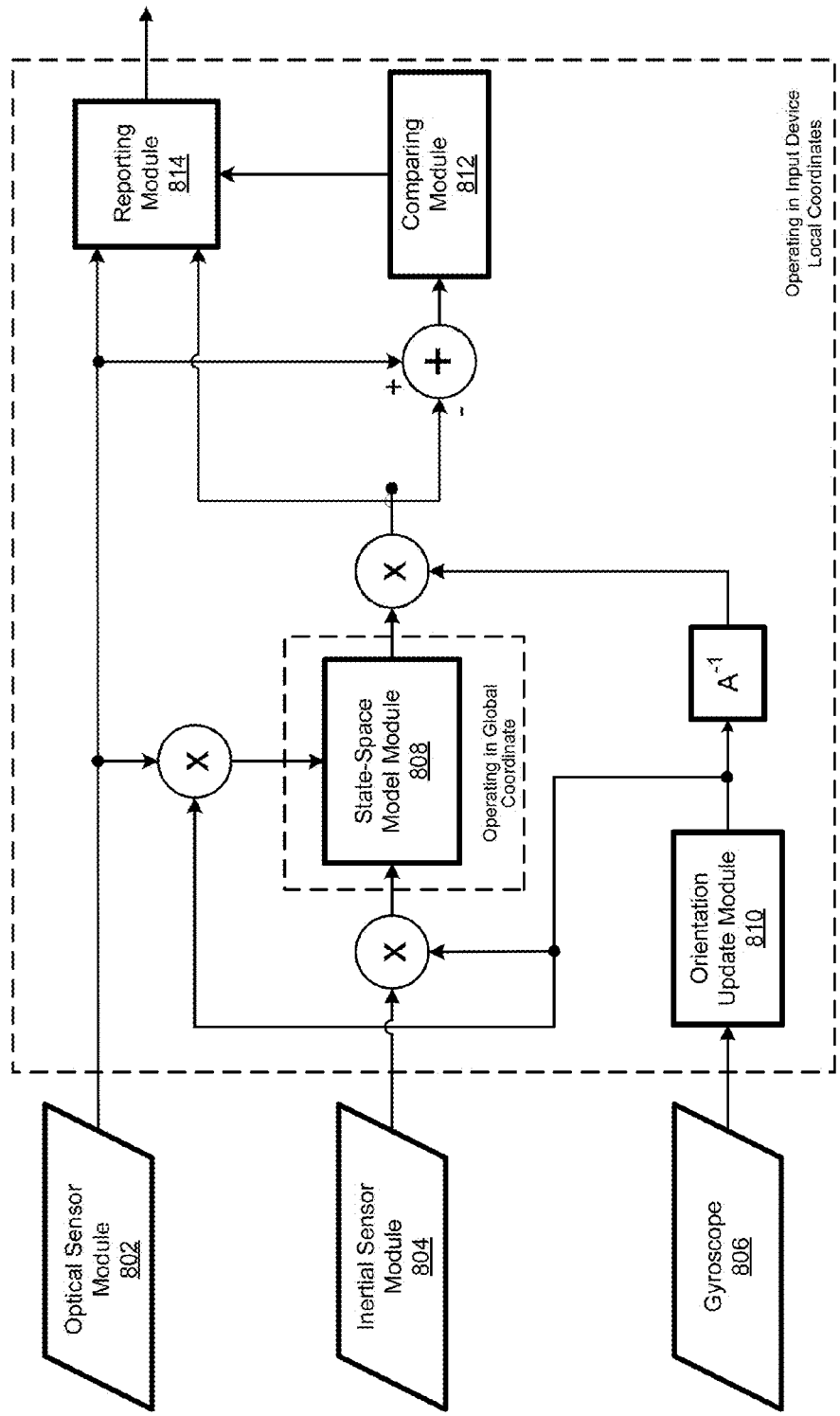
FIG. 8 is simplified block diagram of a tracking module component 240 of an input device 140 according to an alternative embodiment of the present invention.

An additional embodiment of the tracking module 240 is shown in FIG. 8, which may include an optical sensor module 802, an inertial sensor module 804, a gyroscope 806, a state-space model module 808, an orientation update module 810, a comparing module 812, and a reporting module 814.

In some embodiments of the present invention, the state-space model module 412 and 808 may be an Extended Kalman Filter. In some embodiments, when the speed of movement of the input device 140 is below a threshold speed, the Extended Kalman Filter may calibrate the inertial sensor module 404 using the first set of data from the optical sensor module.

Figure 4:
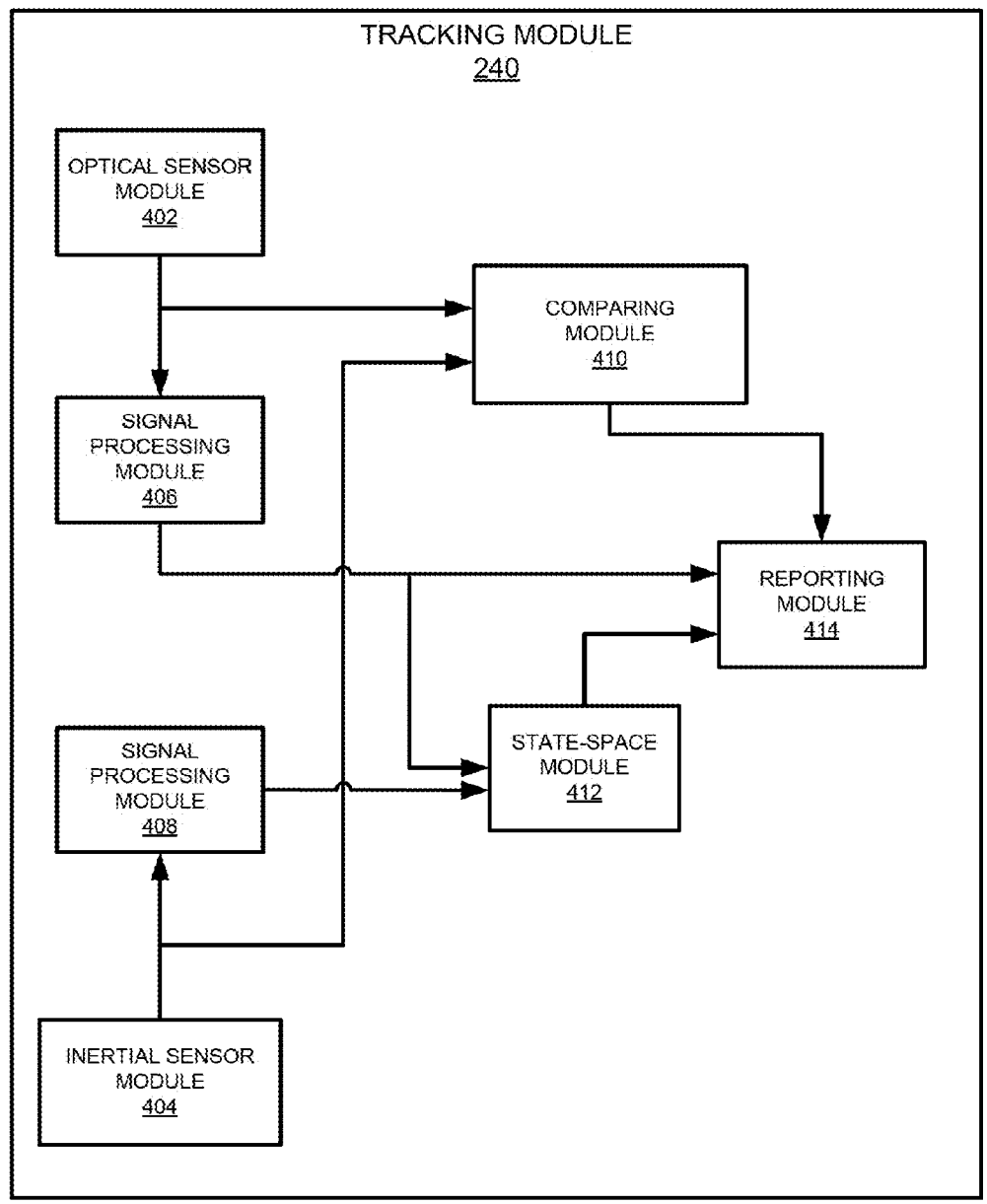
FIG. 4 is simplified block diagram of a tracking module component of an input device according to an embodiment of the present invention.

Additional details of embodiments of the tracking module 240 are described with respect to FIGS. 4 and 8.

The power management module 250 may be configured to manage the electrical power supplied by the power source 230. In some embodiments, the power management module 250 can route power directly from the power source 230 to the input device 140. The power management module 250 can further distribute power from the power source 230 to the other system components (e.g., the input module 210, the control circuit 220, the tracking module 240, the I/O and communications module 270, the memory component 270, or any combination thereof).

The I/O and communications module 260 may be configured to provide input/output capabilities to the input device 140. For example, the I/O and communications module 260 can route data from the input module 110 to the computer system via a hardwire link or wireless connection. The I/O and communications module 260 can route control data, media control data, VoIP data, touch sensor data, and the like, to the computer for further processing. The wireless connection can be a Bluetooth™ connection or any other suitable wireless standard or proprietary wireless network protocol.

The memory component 270 may be a data storage region configured to store data. The memory component 270 may include any hardware, software, firmware, or combination of the preceding for storing and facilitating retrieval of information. The memory component 270 may use any of a variety of data structures, arrangements, and compilations to store and facilitate retrieval of information. In some embodiments, the memory component 270 may be a non-volatile memory. In some embodiments, the memory component 270 may be configured to store data from inputs provided to the input device 140 by the user (e.g., keystrokes, button selections, and motions made by the user along a user interface of the input device 140). In some embodiments, the memory component 270 can store the data for the pairing between the input device 140 and the host device 110. The pairing data may be stored in the memory component 270 even when the input device 140 is powered down. When the input device 140 is reactivated (e.g., powered on or switched from a sleep mode to an active mode), the previously stored pairing data may be accessed and the pairing connection re-established. In some embodiments, the memory component 270 may store pairing data for multiple pairing connections between the input device 140 and a plurality of host devices 110. For example, an input device 140 may be paired with more than one computer system. Exemplary pairing data may include a shared data element, such as a passkey, that was established when the input device 140 and the host device 110 were paired.

The memory component 270 may further be configured to store criteria or rules for processing data from the tracking module 240. The memory component 270 may store profiles containing threshold configuration data for the input device 140. For example, the threshold configuration data may indicate that when the speed of the input device 140 is below a threshold (e.g., 80 inches/second), tracking of the input device 140 should be based on data from the optical sensor module 402. When the speed of the input device 140 is below the threshold tracking of the input device 140 should be based on data from the inertial sensor module 404. In some embodiments, the threshold may be defined by the user or by the manufacturer of the optical sensor module 402 based on the known specifications and limitations of the optical sensor module 402. In other embodiments, the threshold may be based on real-time data obtained by the optical sensor module 402 based on the surface the input device 140 is being moved upon.

Figure 3:
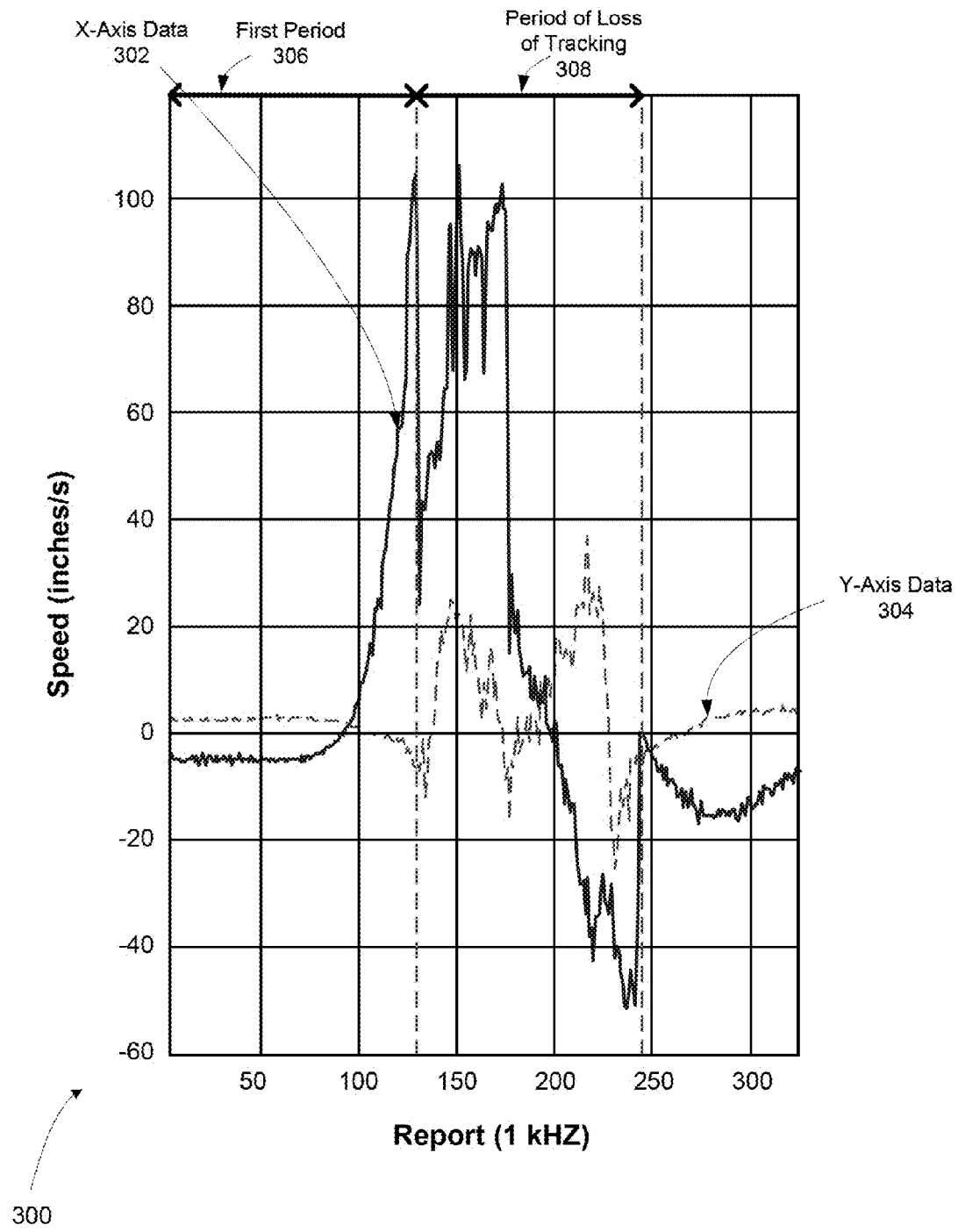
FIG. 3 is a graph of tracking data from an optical sensor in an input device according to an embodiment of the present invention.

FIG. 3 is a graph 300 of tracking data from an optical sensor module 402 in an input device 140 according to an embodiment of the present invention. The graph 300 depicts charted data from the optical sensor module 402 when the input device 140 is moved relative to a surface. In FIG. 3, the x-axis data 302 and the y-axis data 304 are charted separately.

The first period 306 is the period of time where the user is moving the input device 140 at a low rate of speed (e.g., below the threshold for the optical sensor module 402). During the first period 306, the tracking data from the x-axis data 302 and the y-axis data 304 report stable data using the optical sensor module 402. In some embodiments, when the user moves the input device 140 at a speed greater than 100 inches/second, the input device 140 enters a Period of Loss of Tracking 308. In some embodiments, the speed at which the input device 140 enters the Period of Loss of Tracking 308 is greater than or less than 100 inches/second. In some embodiments, entering the Period of Loss of Tracking 308 is based on detecting a difference larger than 50 inches/second between the data from the optical sensor module (402) and the estimate from the Extended Kalman Filter. During the Period of Loss of Tracking 308, the x-axis data 302 and the y-axis data 304 may become unstable and may not report or provide accurate data representing the x-axis and y-axis displacement of the input device 140. In some embodiments, this may be caused by the speed of the user's movements of the input device 140 exceeding a threshold speed above which the optical sensor module 402 is unable to accurately determine its displacement.

The Period of Loss of Tracking 308 ends when the optical sensor module 402 recovers and is able to provide accurate tracking data for the motion of the input device 140. The amount of time that an input device 140 may take to recover from the loss of tracking caused by exceeding the speed threshold of the input device 140 may vary. In some embodiments of the present invention, even when the speed of the input device 140 is reduced to less than the speed threshold, the x-axis data 302 and/or the y-axis data 304 from the optical sensor module 402 may continue to represent inaccurate location data for the input device 140 for an additional period of time. In some embodiments of the present invention, the end of the Period of Loss of Tracking 308 may be detected when the difference between the speed reported by the optical sensor module 402 and the Extended Kalman Filter is below a threshold (e.g., 40 inches/second).

II. Hybrid Tracking of Input Devices Using Optical Sensors and Accelerometers FIG. 4 is simplified block diagram of a tracking module component 240 of an input device 140 according to an embodiment of the present invention. In some embodiments of the present invention, the tracking module 240 may include an optical sensor module 402, an inertial sensor module 404, a plurality of signal processing modules 406 and 408, a comparing module 410, a state-space model module 412, and a reporting module 414. In some embodiments, the signal processing modules 406 and 408 may be a component within the optical sensor module 402 and the inertial sensor module 404. In other embodiments of the present invention, the tracking module 240 may include additional or fewer components as those depicted in FIG. 4.

The optical sensor module 402 may be configured to detect an offset between successive images captured by a sensor or camera that may be a component of the optical sensor module 402. The detected offset can be used to calculate the distance that the input device 140 has moved relative to a surface. The optical sensor module 402 may be configured to obtain or determine a first set of data relating to X-Y displacement of the input device 140 relative to the surface. In some embodiments, the first set of data relating to X-Y displacement of the input device 140 may include the images captured by the sensor or camera in the optical sensor module 402.

In some embodiments, the optical sensor module 402 may include a light source, such as an infrared laser diode, a visible light laser diode, or a light-emitting diode (LED). In some embodiments, the optical sensor module 402 uses image sensors to image naturally occurring texture in materials such as wood, cloth, mouse pads, or other surfaces. In some embodiments, through digital image correlation, the images of these surfaces are captured in continuous succession and compared with each other to determine how far the input device 140 has moved relative to the surface. The optical sensor module 402 may be configured to estimate the direction and amount of motion in units of counts per inch (CPI) along the x-axis and y-axis using the correlations between features detected in successive (and overlapping images).

The inertial sensor module 404 may be configured to measure the acceleration of the input device 140. The inertial sensor module 404 may be further configured to obtain or determine a second set of data relating to the X-Y displacement of the input device 140 using the measured acceleration. The second set of data relating to X-Y displacement of the input device 140 may include acceleration data for the input device 140. In some embodiments of the present invention, the inertial sensor module 404 is an accelerometer.

In some embodiments of the present invention, the data from the inertial sensor module 404 may also be used to determine user data. For example, the data from the inertial sensor module 404 may indicate the emotional health of the user of the input device 140. For example, based on an analysis of the data from the inertial sensor module 404, an increase in jitters or tremors in the data may indicate that the user is becoming tired. In some embodiments, the inertial sensor module 404 can be used to detect specific movement gestures while the device is held in hand. These gestures could include rapid back and forth motion in different directions, swings, flicks or motion in certain paths. In some embodiments, the inertial sensor module 404 can be used to determine the emotional health of the user of the input device 140 when tracking of the input device 140 is being determined by the optical sensor module 402. In other embodiments, the inertial sensor module 404 can be used to simultaneously track the input device 140 and to determine the emotional health of the user of the input device 140.

The signal processing modules 406 and 408 may be configured to receive and process the signals from the optical sensor module 402 and the inertial sensor module 404, respectively. In some embodiments of the present invention, the signal processing modules 406 and 408 may be used to clean-up the signals and reduce noise by removing signal spikes and other high frequency artifacts.

The comparing module 410 may be configured to monitor the data from the optical sensor module 402 and the inertial sensor module 404. The comparing module 410 may be coupled to the optical sensor module 402 and the inertial sensor module 404. The comparing module 410 may be further configured to determine when loss of tracking by the optical sensor module 402 has occurred. The comparing module 410 may be configured to determine or detect the loss of tracking of the input device 140 in real-time based on the data from the optical sensor module 402 and the inertial sensor module 404. In some embodiments of the present invention, the comparing module 410 may determine that the data being generated by the optical sensor module 402 indicates that it is in the Period of Loss of Tracking 308, as shown in FIG. 3.

When the comparing module 410 determines that the optical sensor module 402 is in the Period of Loss of Tracking 308, the comparing module 410 may switch tracking the X-Y displacement of the input device 140 from the first set of data related to X-Y displacement of the input device from the optical sensor module 402 to the second set of data related to X-Y displacement of the input device from the inertial sensor module 404.

The comparing module 410 may be further configured to determine when the optical sensor module 402 has recovered and is providing accurate displacement and position data for the input device 140. In embodiments of the present invention, as the optical sensor module 402 operates by evaluating and correlating data received from the sensor or camera, the speed at which the input device 140 recovers may not be at the same speed or same location at which the loss of tracking occurred. When the comparing module 410 determines that the optical sensor module 402 is no longer in the Period of Loss of Tracking 308, the comparing module 410 may switch tracking of the input device 140 back from the inertial sensor module 404 to the optical sensor module 402.

In other embodiments, the comparing module 410 may determine when the speed of the input device 140 has exceeded the threshold speed. The threshold speed may be a speed, above which the optical sensor module 402 is unable to accurately determine the displacement of the input device 140. In other embodiments, the comparing module 410 may determine when the difference between the speed detected by the optical sensor module 402 and the speed detected by the inertial sensor module 404 exceeds a threshold. Either scenario may be an indication that loss of tracking has occurred. As part of the process for determining whether loss of tracking has occurred, the comparing module 410 may be configured to receive acceleration data for the acceleration of the input device 140 measured by the inertial sensor module 404. Using the acceleration data measured by the inertial sensor module 404, the comparing module 410 may then determine a speed of movement and position data of the input device 140. In some embodiments, the comparing module 410 may determine the speed of movement of the input device 140 by integrating the acceleration of the input device 140 measured by the inertial sensor module 404. The position data of the input device 140 may be determined by integrating the determined speed of movement of the input device 140.

The state-space model module 412 may be a filtering module that is configured to calibrate the inertial sensor module 404. In some embodiments of the present invention, the state-space model module 412 may calibrate the inertial sensor module 404 in real time. In some embodiments of the present invention, the state-space model module may receive data from both the optical sensor module 402 and the inertial sensor module 404. In some embodiments of the present invention, the state-space model module 412 is an Extended Kalman Filter.

The state-space model module 412 may evaluate the history of the signals received from the optical sensor module 402 and the inertial sensor module 404 and estimate where current signals should be. The state-space model module 412 may then determine the difference between the estimated signals and the real-time signals received from the optical sensor module 402 and the inertial sensor module 404. For example, if the estimated signal for the optical sensor module 402 does not match the real-time signal received from the optical sensor module 402, it may be an indication that loss of tracking has occurred. The same analysis may be conducted with respect to the data from the inertial sensor module 404. In some embodiments, the estimated signals and the real-time signals must match within a pre-defined range.

In some embodiments, when the speed of movement of the input device 140 is below the threshold of the optical sensor module 402, the state-space model module 412 may calibrate the inertial sensor module 404 using the first set of data from the optical sensor module 402. In some embodiments, the comparing module 410 may use the last known calibration point estimated by the state-space model module 412.

The reporting module 414 may be configured to send data to the host device 110 that indicates the position of the input device 140 at a given time. In some embodiments the reporting module 814 may be a switch that passes either the data from the optical sensor module 802, or the data from the inertial sensor module 804. In some embodiments, of the present invention, the reporting module 414 may send the data directly to the host device 110. In other embodiments, the reporting module 414 may send the data to the I/O and communications module 260, which then transmits the data to the host device 110. In some embodiments, the input device 14 may be operably connected to the host device 110 via a hardwire link or via a wireless connection. In embodiments using the wireless connection, the wireless connection may be a Bluetooth™ pairing connection or any other wireless standard or proprietary wireless network protocol.

Figure 5:
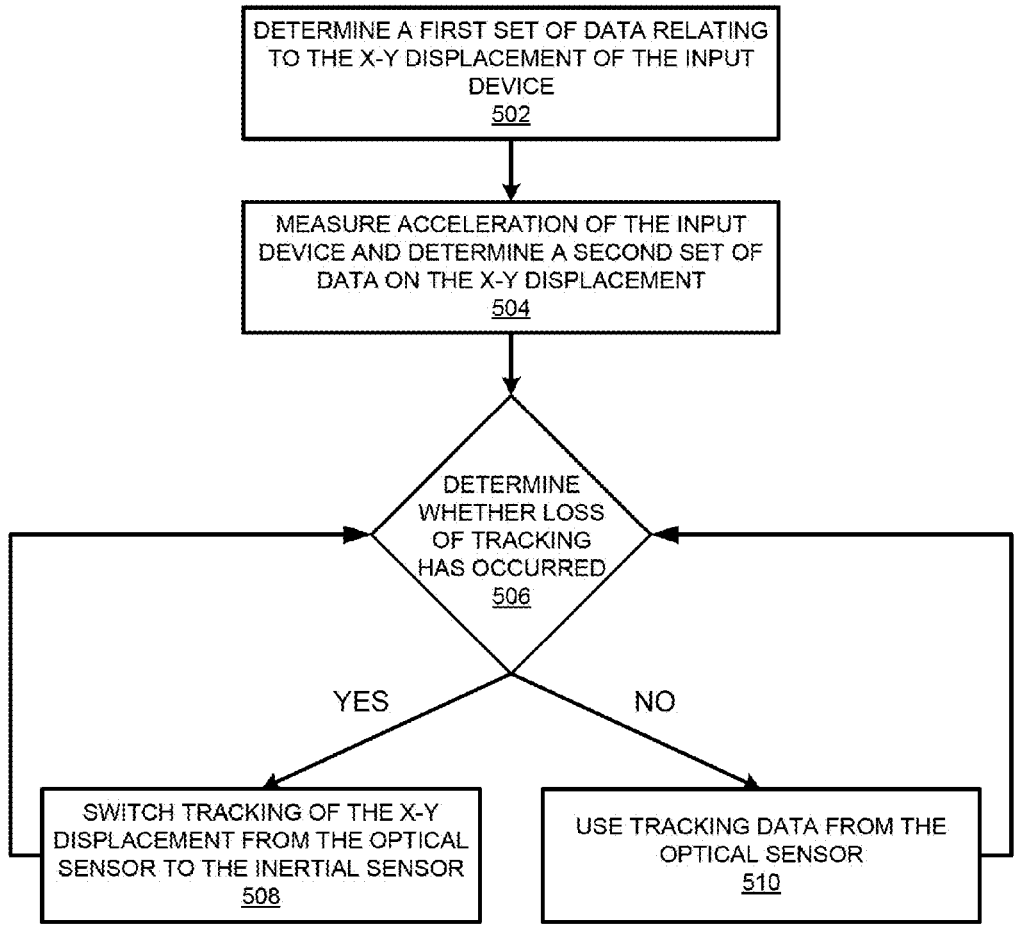
FIG. 5 is a flowchart of a method of operating an input device using multiple sensors where loss of tracking occurs according to an embodiment of the present invention.

FIG. 5 is a flowchart of a method 500 of operating an input device 140 using multiple sensors where loss of tracking occurs according to an embodiment of the present invention. The method 500 can be performed by processing logic that may comprise hardware (circuitry, dedicated logic, etc.), software (such as is run on a general purpose computing system or a dedicated machine), firmware (embedded software), or any combination thereof.

The method includes obtaining, by an optical sensor module 402, a first set of data relating to X-Y displacement of the input device 140 (502). The data from the optical sensor module 402 may be determined based on a series of images captured by a sensor or camera component of the optical sensor module 402. The two successive images of the series of image may be evaluated to determine an offset between the two successive images. This offset may be used to determine the X-Y displacement of the input device 140. The offset may also be determined by comparing a succession of more than two images.

The method includes obtaining, by an inertial sensor module 404, a second set of data relating to X-Y displacement of the input device 140 (504). The data from the inertial sensor module 404 may be determined based on acceleration data obtained by the inertial sensor module 404. The acceleration data can be used to determine the speed of the input device 140 and the position of the input device 140 at a given time.

The method further comprises determining whether loss of tracking by the optical sensor module 402 has occurred (506).

In some embodiments of the present invention, loss of tracking of the input device 140 may be determined by a state-space model module 412 that evaluates the history of the signals received from the optical sensor module 402 and the inertial sensor module 404 in order to estimate where a current, real-time signals should indicate. The state-space model module 412 may determine the difference between the estimated signals and the real-time signals received from the optical sensor module 402 and the inertial sensor module 404. For example, if the estimated signal for the optical sensor module 402 does not match the real-time signal received from the optical sensor module 402, it may be an indication that loss of tracking has occurred. In some embodiments, the estimated signals and the real-time signals must match within a pre-defined range.

In some embodiments of the present invention, instead of comparing the speed of the input device 140 to a fixed threshold, the threshold is variable. The threshold may be variable as it may depend on the quality of the tracking surface measured by the optical sensor module 402.

In other embodiments of the present invention, detection of loss of tracking is based on comparing the speed estimated by the Extended Kalman Filter and the speed estimated by the optical sensor module 402. In such embodiments, a difference between a first speed of movement estimated by the optical sensor module and a second speed of movement estimated by the inertial sensor module may be determined. If the two estimates differ by more than a certain value, a make threshold (e.g., 50 inches/second), loss of tracking is detected. In such embodiments, to find the end of the period of loss of tracking, another threshold, a break threshold (e.g., 40 inches/second), is used. When the output of the Extended Kalman Filter and the optical sensor module 402 has a difference reduces to a value less than the break threshold, end of loss of tracking is detected. The value of make and break thresholds may depend on the noise characteristics of the specific optical sensors and accelerometers used in the input device 140.

In other embodiments of the present invention, loss of tracking of the input device 140 may also be determined by an evaluation of the speed of the input device 140. For example, when the speed exceeds the threshold for the optical sensor module 402, the input device 140 may automatically be configured to switch to the inertial sensor module 404. Recovery from loss of tracking can then be determined when the speed of the input device 140 drops below the threshold for the optical sensor module 402. The speed of the input device 140 may be continuously determined so that tracking automatically switches from the inertial sensor module 404 to the optical sensor module 402 when the speed of the input device 140 drops below the threshold for the optical sensor module 402.

In other embodiments of the present invention, loss of tracking of the input device 140 may also be determined by a filter detecting when the signal received from the optical sensor module 402 is noisy or contains a lot of high frequency distortion. Recovery from loss of tracking can then be determined when the signal received from the optical sensor module 402 contains less noise or less high frequency distortion The method further comprises switching tracking of the X-Y displacement of the input device 140 from the optical sensor module 402 to the inertial sensor module 404 when the loss of tracking of the optical sensor module 402 is determined (508). In embodiments of the present invention, the comparing module 410 in the tracking module 240 may provide an indication to the reporting module 414 that data from the inertial sensor module 404 should be used as the data representing the X-Y displacement of the input device 140.

In some embodiments of the present invention, the optical sensor module 402 and the inertial sensor module 404 operate simultaneously and provide data to the reporting module 414. In such embodiments, when the loss of tracking of the input device 140 is determined, the reporting module 414 selects the required data for sending to the I/O and communications module 260 or to the host device 110. The comparing module 410 may continuously monitor whether or not loss of tracking has occurred or whether the optical sensor module 402 has recovered.

In some embodiments of the present invention, when tracking is switched from using the optical sensor module 402 to the inertial sensor module 404, the power to the optical sensor module 402 may be reduced or eliminated. In such scenarios, power consumption may be temporarily reduced by not requiring both sensors to be fully powered simultaneously.

The method further comprises using the tracking of the X-Y displacement of the input device 140 from the optical sensor module 402 when it is determined that loss of tracking has not occurred (510), or when it is determined that the optical sensor module 402 has recovered from the period of loss of tracking.

It should be appreciated that the specific steps illustrated in FIG. 5 provide a particular method of operating an input device using multiple sensors where loss of tracking occurs according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

III. Hybrid Tracking of Input Devices Using Optical Sensors, Accelerometers and Gyroscopes There are situations when the motion made by a user interacting with an input device 140 is not a pure linear displacement (e.g., a straight horizontal movement). In such situations, as the user moves the input device 140, the user may introduce a rotation to the motion of the input device 140. An inertial sensor module (e.g., accelerometer) 404 may be sensitive to the rotation of the input device 140, resulting in fictitious (e.g. centrifugal or Coriolis) accelerations being detected. For example, when the input device 140 is moved, the input device 140 may also be rotated (representing by angle theta θ in FIG. 7). Thus, in alternative embodiments of the present invention, the tracking module 240 may further include a gyroscope (e.g., a device configured to measure a rate of rotation or a rate of change of angular displacement [e.g., angular velocity]).

Note that in some situations, the input device 140 may be moved in a manner that does not create fictitious accelerations. This may occur when the input device 140 is moved but not rotated. As shown by input device 140-1 in FIG. 7, the input device 140-1 has been moved from the starting position 140 along the y-axis 602 of a local frame of the input device. From the global frame 702, the input device 140-1 has not experienced any rotation.

Figure 6:
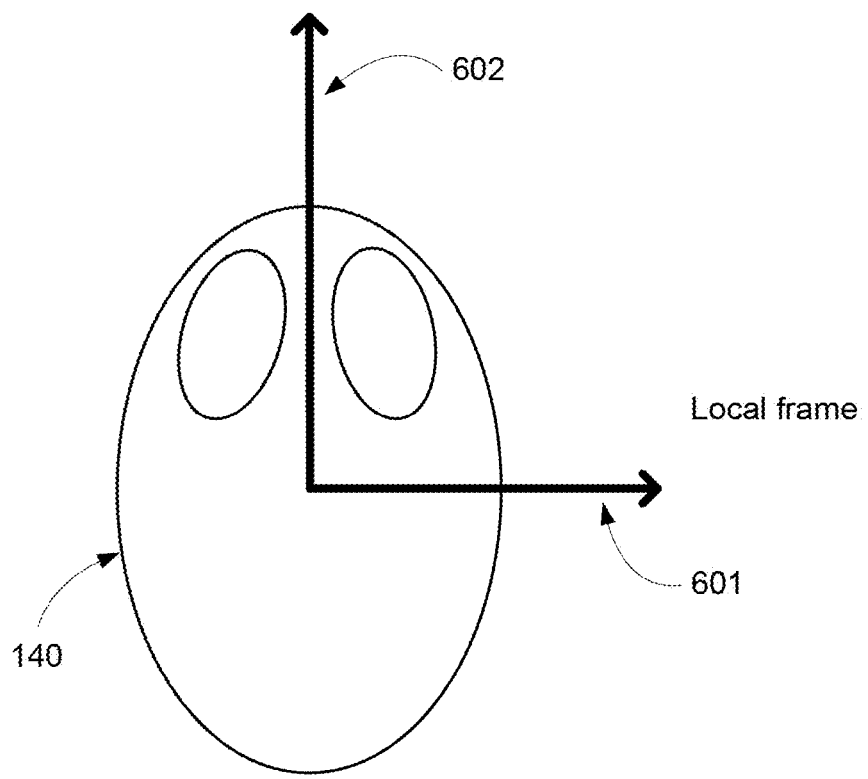
FIG. 6 depicts an input device according to an embodiment of the invention.

In some embodiments of the present invention, input device 140 may report motion relative to a coordinate system associated with the frame of the input device (e.g., the local frame). For example, as shown in FIG. 6, the x-axis 601 for the input device 140 may be along a horizontal direction relative to the center of the input device 140, while the y-axis 602 for the input device 140 may be along a vertical direction relative to the center of the input device 140.

Figure 7:
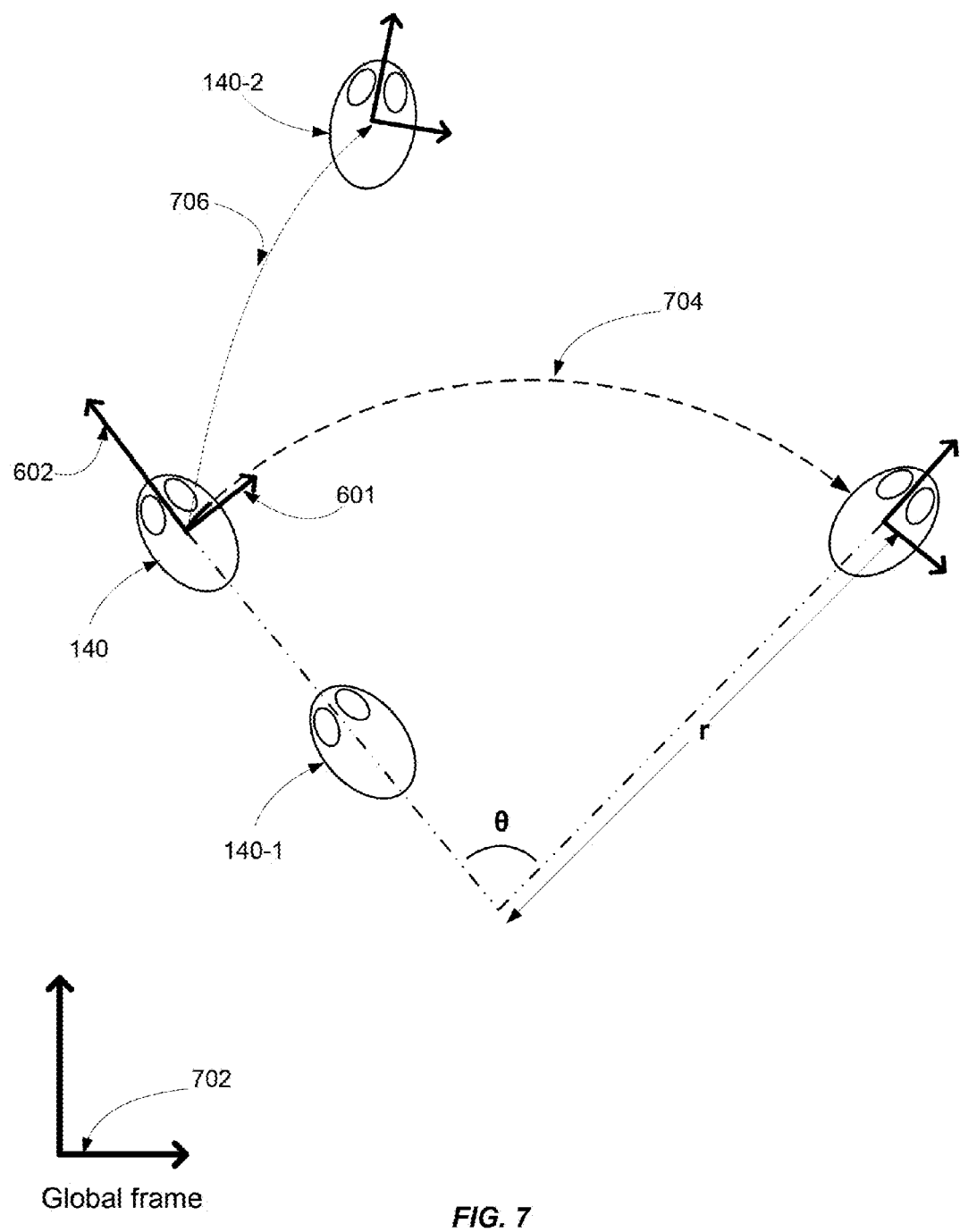
FIG. 7 illustrates a movement of an input device according to an embodiment of the invention.

In some embodiments of the present invention, when the input device 140 is moved in a pure circular rotation 704 (e.g. the x-axis 601 of the optical sensor module 402 is aligned to the tangent of the trajectory and the y-axis 602 is perpendicular to the tangent of the trajectory), as shown in FIG. 7, the optical sensor module 402 may report motion only in the x-axis and no motion in the y-axis. However, from the point of view of a fixed, non-rotation reference frame (e.g., a global frame or axis 702), the trajectory of the input device 140 is a curve. In other situations where the rotation is not pure (for example, the motion depicted as dashed line 706 representing the motion of input device 140-2 in FIG. 7), the tracking module may detect motion along both the x-axis and y-axis.

FIG. 8 is simplified block diagram of an alternative tracking module component 240 of an input device 140 according to an alternative embodiment of the present invention. In some embodiments of the present invention, the tracking module 240 may include an optical sensor module 802, an inertial sensor module 804, a gyroscope 806, a state-space model module 808, an orientation update module 810, a comparing module 812, and a reporting module 814. In some embodiments, signal processing modules 406 and 408, as described with respect to FIG. 4, may be components within the optical sensor module 402 and the inertial sensor module 404. In other embodiments of the present invention, the tracking module 240 may include additional or fewer components as those depicted in FIG. 4.

The optical sensor module 802 may be configured to detect an offset between successive images captured by a sensor or camera that may be a component of the optical sensor module 802. The detected offset can be used to calculate the distance that the input device 140 has moved relative to a surface. The optical sensor module 802 may be configured to obtain a first set of data relating to X-Y displacement of the input device 140 relative to the surface. In some embodiments, the first set of data relating to X-Y displacement of the input device 140 may include the images captured by the sensor or camera.

In some embodiments, the optical sensor module 802 may include a light source, such as an infrared laser diode or a light-emitting diode (LED). In some embodiments, the optical sensor module 802 uses image sensors to image naturally occurring texture in materials such as wood, cloth, mouse pads, or other surfaces. In some embodiments, through digital image correlation, the images of these surfaces are captured in continuous succession and compared with each other to determine how far the input device 140 has moved relative to the surface. The optical sensor module 802 may be configured to estimate the direction and amount of motion in units of counts per inch (CPI) along the x-axis and y-axis using the correlations between features detected in successive (and overlapping images).

The inertial sensor module 804 may be configured to measure the acceleration of the input device 140. The inertial sensor module 804 may be further configured to obtain a second set of data relating to the X-Y displacement of the input device 140 using the measured acceleration. The second set of data relating to X-Y displacement of the input device 140 may include acceleration data for the input device 140. In some embodiments of the present invention, the inertial sensor module 804 is an accelerometer.

The acceleration measured by the inertial sensor module 804 may be represented as:

$$a = a_{linear} + (2\Omega \times v) + (\Omega \times r) + (\Omega \times \Omega \times r),$$

where the measured acceleration is a function of linear acceleration, and fictitious accelerations (the Coriolis, Euler, and the centrifugal accelerations), where r is the measure value shown in FIG. 7, representing the distance from the input device 140 to the point of rotation, and where:

$$\Omega = \frac{d\theta}{dt}$$

In some embodiments, the signals from the optical sensor module 802 and inertial sensor module 804 may be received and processed by signal processing modules. In some embodiments of the present invention, the signal processing modules may be used to clean-up the signals and reduce noise by removing signal spikes and other high frequency artifacts.

The gyroscope 806 may be configured to measure a rate of rotation or a rate of change of angular displacement of the input device 140. The rotation may be introduced by the motion of the user moving the input device 140. Except in situations where the input device 140 is being moved along a straight line parallel to the x-axis or the y-axis of the local frame, a rotation may be created. This may be caused by the user moving the input device 140 in an arc motion (as shown by dashed line 704 in FIG. 7). The arc may be caused by the user rotating the input device 140 around an arm, at an elbow, or at a wrist.

The gyroscope 806 may be configured to measure the angular velocity of the input device 140 continuously when the input device 140 is operational, where the angular velocity ($\omega$) is given by:

$$\omega = \frac{d\theta}{dt}$$

where angle theta ($\theta$) represents the measured angle of the motion of the input device 140 in the global frame 702. During periods of time when the input device 140 is not in motion, the orientation of the gyroscope 806 may be reset to zero. When the input device 140 is in motion, the orientation of the gyroscope 806 may be updated at a regular basis (e.g., every millisecond), corresponding to the sampling rate of the inertial sensor unit 404.

The state-space model module 808 may be a filtering module that is configured to calibrate the inertial sensor module 804. In some embodiments of the present invention, the state-space model module 808 may calibrate the inertial sensor module 804 in real time. In some embodiments of the present invention, the state-space model module may receive data from both the optical sensor module 802 and the inertial sensor module 804. In some embodiments, the calibration consists of estimating the bias of the inertial sensor module 804. In some embodiments the calibration consists of estimating both the bias and gain of the inertial sensor module 804. In some embodiments, the state-space model module may receive the signal from the inertial sensor module 804 after the acceleration data has been modified to cancel the effects of rotation on the value from the inertial sensor module 804.

In some embodiments of the present invention, the state-space model module 808 may be an Extended Kalman Filter. The state-space model module 808 may operate in the global frame 702 (e.g., 702 in FIG. 7) and may transform the output to the local frame.

The state-space model module 808 may evaluate the history of the signals received from the optical sensor module 802 and the inertial sensor module 804 and estimate where current signals should be. The state-space model module 808 may then determine the difference between the estimated signals and the real-time signals received from the optical sensor module 802 and the inertial sensor module 804. For example, if the estimated signal for the optical sensor module 802 does not match the real-time signal received from the optical sensor module 802, it may be an indication that loss of tracking has occurred. The same analysis may be conducted with respect to the data from the inertial sensor module 804. In some embodiments, the estimated signals and the real-time signals must match within a pre-defined range.

The state-space model module 808 may carry out the following operations:

1. The output from the inertial sensor module 804, $a_x$ and $a_y$ are transformed using the following formula:

$$\begin{bmatrix} u_x \\ u_y \end{bmatrix} = R \begin{bmatrix} a_x \\ a_y \end{bmatrix}$$

2. The state-space model module 808 then tracks the speed of motion of the input device 140 in each of the x-axis and y-axis using the following formulas:

$$s_{x,t+1} = s_x + g_t \mu_{x,t} - b_{x,t} + w_{1,t}$$

$$s_{y,t+1} = s_y + g_t \mu_{y,t} - b_{y,t} + w_{2,t}$$

$$g_{t+1} = g_t + w_{3,t}$$

$$b_{x,t+1} = b_{t,k} + w_{4,t}$$

$$b_{y,t+1} = b_{t,k} + w_{5,k}$$

where $s_x$ and $s_y$ may be the estimated speed of motion along the x-axis and y-axis, g may be the gain of the inertial sensor module 804, and $b_x$ and $b_y$ may be the biases of the inertial sensor module 804.

3. An error term for the state-space model module 808 may be determined using the following formula, where $optic_x$ and $optic_y$ are the speeds of motion reported by the optical sensor module 402:

$$y = R \begin{bmatrix} optic_x \\ optic_y \end{bmatrix} - \begin{bmatrix} s_x \\ s_y \end{bmatrix}$$

4. The motion reported (e.g., the corrected acceleration data) may be generated by rotating back the tracked speed in the global frame 702 to the local frame of the input device 140 using the following formulas:

$$\begin{bmatrix} m_x \\ m_y \end{bmatrix} = R^{-1} \begin{bmatrix} s_x \\ s_y \end{bmatrix}$$

In some embodiments, when the speed of movement of the input device 140 is below the threshold of the optical sensor module 802, the state-space model module 808 may calibrate the inertial sensor module 804 using the first set of data from the optical sensor module 802. In some embodiments, the comparing module 410 may use the last known calibration point estimated by the state-space model.

The orientation update module 810 may be configured to update the orientation of the gyroscope 806 when the input device 140 is in motion. The orientation of the gyroscope 806 may be represented at any given time step "t" by a matrix $R_t$, using the update formula:

$$R_{t+1} = R_t e^{\begin{bmatrix} 0 & -\omega_t \Delta t \\ \omega_t \Delta t & 0 \end{bmatrix}}$$

When the input device 140 is not in motion, the orientation of the gyroscope 806 may be reset to zero. By resetting the orientation of the gyroscope 806 to zero, it provides a starting point for calculations from when the input device 140 next begins to be moved. In some embodiments of the present invention, the orientation of the gyroscope 806 determined by the orientation update module 810 may be inverted through matrix inversion. The matrix inversion may be conducted prior to the data being sent to the state-space model module 808 and/or to the comparing module 812 and report module 814.

The comparing module 812 may be configured to compare the output of the state-space model module 808 with the signal data received from the optical sensor module 802. Comparing the output of the state-space model module 808 with the signal data received from the optical sensor module 802 may include determining a difference between the two signals. If the difference between the output of the state-space model module 808 and the output from the optical sensor module 802 is above a pre-determined threshold value, loss of tracking may be indicated and the output of the tracking module 240 may be switched from the optical sensor module 802 to the output of the state-space model module 808. If the difference is below the pre-determined threshold value, it may indicate that loss of tracking has not occurred or that the optical sensor module 802 has recovered, and that the signal data from the optical sensor module 802 is valid.

The reporting module 814 may be configured to send data to the host device 110 that indicates the position of the input device 140 at a given time. In some embodiments, the reporting module 814 may be a switch that passes either the data from the optical sensor module 802, or the filtered and corrected acceleration data from the inertial sensor module 804. In some embodiments of the present invention, the reporting module 814 may send the data directly to the host device 110. In other embodiments, the reporting module 814 may send the data to the I/O and communications module 260, which then transmits the data to the host device 110. In some embodiments, the input device 14 may be operably connected to the host device 110 via a hardwire link or via a wireless connection. In embodiments using the wireless connection, the wireless connection may be a Bluetooth™ pairing connection or any other wireless standard or proprietary wireless network protocol.

Figure 9:
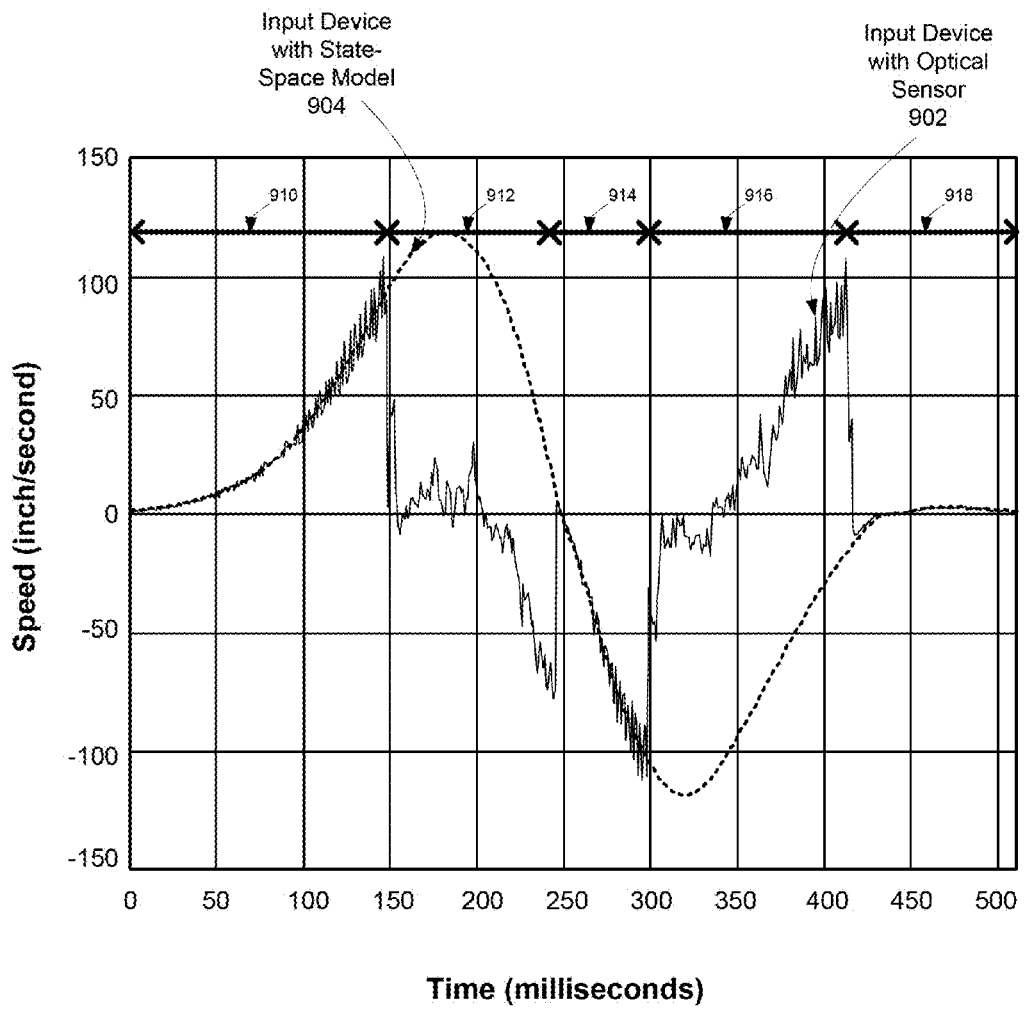
FIG. 9 is a graph of tracking data from an input device according to an embodiment of the present invention.

FIG. 9 is a graph 900 of tracking data from an input device according to an embodiment of the present invention. FIG. 9 shows an example of the output of the reporting module when the input device 140 is moved with a rapid motion. The output of an input device 140 with only an optical sensor is depicted as line 902. The output of an input device 140 with a state-space model module is depicted as line 904. In some embodiments, outputs 902 and 904 depict the motion of the input device 140 moving in a left-right motion followed by a right-left motion. The graph also depicts a first period 910, a second period 912, a third period 914, a fourth period 916, and a fifth period 918, representing separate periods of time where the input device 140 is in motion.

In the first period 910, the input device 140 is moved starting at zero inches per second at time 0 ms at increasing speed. At time 150 ms, the input device 140 is moving at 100 inches per second. In some embodiments of the present invention, through the first period 910, the input device with the state-space model 904 stays stable, while the output from input device with only the optical sensor 902 begins to fluctuate and produce unreliable displacement data as loss of tracking is occurring.

In the second period 912, the speed of the input device 140 exceeds 100 inches per second. In this embodiment, the input device with the optical sensor 902 enters a period of loss of tracking causing the output to jump around to random positions as the optical sensor attempts to correlate images. As the input device 140 slows down, the input device with the optical sensor 902 begins to recover. In this example, the input device with the optical sensor 902 does not fully recover from loss of tracking until the speed approaches 0 inches per second at approximately time 250 ms. In contrast, the output of the input device with the state-space model 904 remains stable. By the end of the second period, the input device 140 has been moved in a complete left to right motion.

In the third period 914, the input device 140 begins to be moved in a right to left motion. At time 300 ms, the input device 140 is moving at 100 inches per second opposite the direction originally moved from times 0 to 250 ms. In some embodiments of the present invention, through the third period 914, the input device with the state-space model 904 stays stable, while the output from input device with only the optical sensor begins to fluctuate as loss of tracking is occurring. In this example, the input device with the optical sensor 902 does not fully recover from loss of tracking until the speed approaches 0 inches per second at approximately time 425 ms, while the output of the input device with the state-space model 904 remains stable.

In the fourth period 916, the input device with the optical sensor 902 again experiences loss of tracking as the motion of the input device 140 exceeds the upper limit for the optical sensor. As the input device 140 slows down, the input device with the optical sensor 902 begins to recover. In this example, the input device with the optical sensor 902 does not fully recover from loss of tracking until the speed approaches 0 inches per second at approximately time 420 ms. In contrast, the output of the input device with the state-space model 904 remains stable throughout the fourth period 916.

In the fifth period 918, the input device 140, the input device with the optical sensor 902 has recovered from loss of tracking and the output is stable and close to or identical to the output from the input device with the state-space model 904 while the input device 140 is being moved with relatively slower motion.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teaching provided herein, a person of ordinary skill in the art will appreciate other ways and/or methods to implement the present invention.

In embodiments, any of the entities described herein may be embodied by a computer that performs any or all of the functions and steps disclosed.

It should be noted that any recitation of "an", "an" or "the" is intended to mean "one or more" unless specifically indicated to the contrary.

It is also understood that the examples and embodiments described herein are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. An input device comprising:
   an optical sensor module to generate a first set of data corresponding to an X-Y displacement of the input device;
   an inertial sensor module to measure an acceleration of the input device and to generate a second set of data corresponding to the X-Y displacement of the input device; and
   a microcontroller coupled to the optical sensor module and the inertial sensor module to:
   receive acceleration data corresponding to the acceleration of the input device measured by the inertial sensor module;
   determine a speed of movement and a position of the input device using the acceleration data;
   detect a loss of tracking condition based on the determined speed of movement; and
   switch from tracking the X-Y displacement of the input device using the first set of data from the optical sensor module to using the second set of data from the inertial sensor module in response to detecting the loss of tracking condition.

2. The input device of claim 1, wherein the inertial sensor module is an accelerometer.

3. The input device of claim 1, wherein switching from tracking the X-Y displacement of the input device using the first set of data from the optical sensor module to using the second set of data from the inertial sensor module further comprises using a last known calibration point estimated by a state-space model.

4. The input device of claim 3, wherein the state-space model is an Extended Kalman Filter.

5. The input device of claim 4, wherein switching from tracking the X-Y displacement of the input device using the first set of data from the optical sensor module to using the second set of data from the inertial sensor module is based on a speed of movement of the input device, wherein when the speed of movement of the input device is below a threshold speed, the Extended Kalman Filter calibrates the inertial sensor module using the first set of data from the optical sensor module.

6. The input device of claim 5, wherein the loss of tracking is detected when the speed of movement of the input device exceeds the threshold speed.

7. The input device of claim 6, wherein the loss of tracking condition is detected in real-time.

8. The input device of claim 1, wherein the loss of tracking condition is detected when a difference between a first speed of movement estimated by the optical sensor module and a second speed of movement estimated by the inertial sensor module exceeds a threshold value.

9. A method of operating an input device, the method comprising:
   generating, by an optical sensor module, a first set of data corresponding to an X-Y displacement of the input device;
   generating, by an inertial sensor module, a second set of data corresponding to the X-Y displacement of the input device;
   tracking the X-Y displacement of the input device using the first set of data generated by the optical sensor;
   detecting whether a loss of tracking condition by the optical sensor module has occurred based on the first set of data; and
   switching from tracking the X-Y displacement of the input device using the first set of data from the optical sensor module to using the second set of data from the inertial sensor module in response to detecting the loss of tracking condition by the optical sensor module.

10. The method of claim 9 wherein loss of tracking of the optical sensor module is detected when a difference between a first speed of movement estimated by the optical sensor module and a second speed of movement estimated by the inertial sensor module exceeds a threshold value.

11. The method of claim 9 wherein the loss of tracking of the optical sensor module is detected when a speed of movement of the input device exceeds a threshold value.

12. The method of claim 11 wherein determining the speed of movement of the input device further comprises:
determining acceleration data for the acceleration of the input device measured by the inertial sensor module; and
determining the speed of movement and position data of the input device using the acceleration data.

13. The method of claim 9 further comprising:
determining whether the optical sensor module has recovered from the loss of tracking; and
switching from tracking of the X-Y displacement of the input device from using the second set of data from the inertial sensor module to the first set of data from the optical sensor module, when the optical sensor module has recovered from the loss of tracking.

14. An input device comprising:
an optical sensor module to generate a first set of data relating to an X-Y displacement of the input device;
an inertial sensor module to measure an acceleration of the input device and to generate a second set of data corresponding to the X-Y displacement of the input device;
a gyroscope to measure a rate of rotation of the input device; and
a microcontroller coupled to the optical sensor module, gyroscope, and the inertial sensor module to:
modify the measured acceleration of the input device using the measured rate of rotation of the input device;
determine a speed of movement and position data of the input device using the modified acceleration data;
detect a loss of tracking condition based on the determined speed of movement; and
switch from tracking the X-Y displacement of the input device using the first set of data from the optical sensor module to using the second set of data from the inertial sensor module in response to detecting the loss of tracking condition.

15. The input device of claim 14, wherein modifying acceleration data of the input device includes canceling out the measured rate of rotation of the input device.

16. The input device of claim 14, wherein the loss of tracking is detected when a difference between a first speed of movement estimated by the optical sensor module and a second speed of movement estimated by the inertial sensor module exceeds a threshold.

17. The input device of claim 14, wherein the loss of tracking is detected when a speed of movement of the input device exceeds a threshold.

18. The input device of claim 14, wherein the microcontroller is configured to continuously update an orientation of the input device using the rate of rotation of the input device measured by the gyroscope when the input device is in motion.

19. A method of operating an input device, the method comprising:
generating, by an optical sensor module, a first set of data relating to X-Y displacement of the input device;
generating, by an inertial sensor module, a second set of data relating to the X-Y displacement of the input device;
measuring, by a gyroscope, a rate of rotation of the input device;
modifying the second set of data using the measured rate of rotation of the input device;
detecting whether a loss of tracking by the optical sensor module has occurred based on the first set of data; and
switching from tracking the X-Y displacement of the input device using the first set of data from the optical sensor module to using the modified second set of data from the inertial sensor module in response to detecting the loss of tracking condition by the optical sensor module.

20. The method of claim 19 wherein loss of tracking of the optical sensor module is detected when a difference between a first speed of movement estimated by the optical sensor module and a second speed of movement estimated by the inertial sensor module exceeds a threshold value.

21. The method of claim 19 wherein loss of tracking of the optical sensor module is detected when a speed of movement of the input device exceeds a threshold value.

22. The method of claim 21 wherein determining the speed of movement of the input device further comprises:
determining acceleration data for the acceleration of the input device measured by the inertial sensor module; and
determining the speed of movement and position data of the input device using the acceleration data.

23. The method of claim 19 further comprising:
determining whether the optical sensor module has recovered from the loss of tracking; and
switching from tracking of the X-Y displacement of the input device from using the second set of data from the inertial sensor module to the first set of data from the optical sensor module, when the optical sensor module has recovered from the loss of tracking.

* * * * *